United States Patent Office 2,760,865
Patented Aug. 28, 1956

2,760,865
FEED CONTAINING L-LYXOFLAVIN

Karl A. Folkers, Plainfield, N. J., assignor to Merck & Co., Inc., Rahway, N. J., a corporation of New Jersey No Drawing. Application March 18, 1952,
Serial No. 277,297

3 Claims. (Cl. 99—2)

This invention relates to a valuable new vitamin and growth promoting agent, more particularly it is concerned with L-lyxoflavin, processes for preparing this compound, and new growth promoting compositions containing L-lyxoflavin.

In 1949, Pallares and Garza (Arch. Biochem., 22, 63 (1949).) reported the isolation of a pentose flavine from the human heart myocardium whch was indicated to be different than riboflavin by the configuration of the groups about the $C_4$ pentose side chain. These investigators named the new product L-lyxoflavin since it was postulated that the compound was formed by the union of L-lyxose with a flavine.

It is an object of this invention to provide this new compound L-lyxoflavin. A further object is to provide new compositions containing lyxoflavin which are found to have valuable growth promoting properties for animals. Other objects will be apparent from the detailed description hereinafter provided.

I have found that L-lyxoflavin may be prepared by reductively condensing L-lyxose with 3,4-xylidine to obtain N-L-lyxityl-4,5-dimethyl aniline, reacting the latter compound with an aryl diazonium halide to produce N-L-lyxityl-2-arylazo-4,5-dimethyl aniline, and reacting this azo compound with barbituric acid or alloxan to yield L-lyxoflavin. This process may be chemically represented as follows:

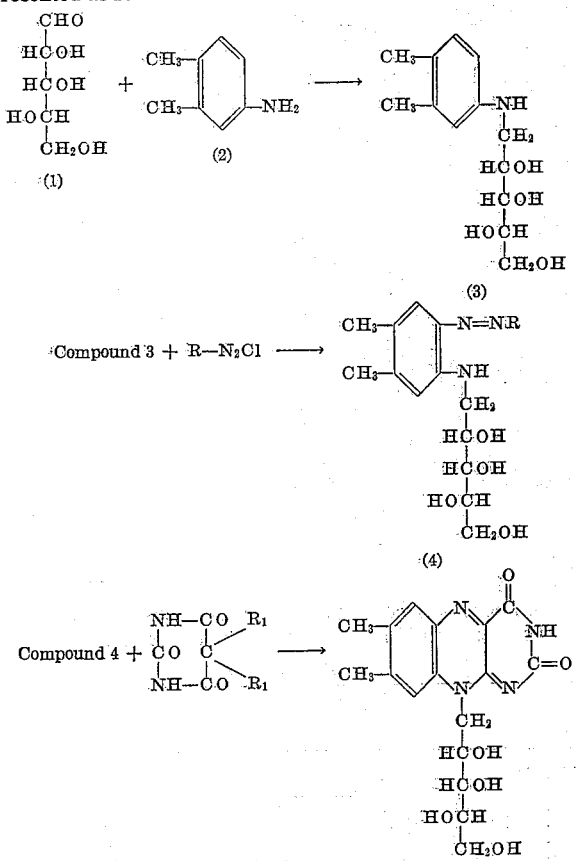

wherein R represents a phenyl or para substituted phenyl substituent and $R_1$ represents hydroxyl or hydrogen.

In the first step of the synthesis a solution of L-lyxose in a lower aliphatic alcohol such as methanol, ethanol, or isopropanol is added to a solution of 3,4-xylidine in a similar solvent, and the resulting solution is reduced in the presence of hydrogen and a hydrogenation catalyst such as Raney nickel, nickel, palladium, palladium oxide, platinum oxide and the like. In this process, the starting material, L-lyxose may be either a crude product such as that prepared by Hockett et al. (J. A. C. S., 56, 1632 (1934)) or a highly purified crystalline form prepared as shown by Fletcher et al. (J. A. C. S., 72, 4546 (1950)). The use of pure L-lyxose in the reductive condensation results in a nearly quantitative yield of N-L-lyxityl-4,5-dimethyl aniline. However, the crude syrupy L-lyxose may be used for this condensation and the yield of the xylidine derivative appears to represent the purity of the crude L-lyxose employed.

This hydrogenation is preferably effected employing methanol as the solvent medium under a superatmospheric pressure of about 100 atmospheres and a temperature of about 60–100° C. After the hydrogenation is completed, the catalyst is removed by filtration from the resulting solution and the product N-L-lyxityl-4,5-dimethyl aniline is conveniently recovered by cooling the filtered solution to effect precipitation of the product which may then be recovered in accordance with conventional processes used in the art.

In the second step of my process, the N-L-lyxityl-4,5-dimethyl aniline is reacted with a suitable diazonium salt to obtain the corresponding 2-azo derivative of N-L-lxityl-4,5-dimethyl aniline. Suitable diazonium salts which may be used in this reaction that might be mentioned are para-substituted aniline derivatives or a benzene diazonium halide.

I have found that this condensation is most readily carried out by reacting a suspension of N-L-lyxityl-4,5-dimethyl aniline in a hydrochloric acid medium buffered to about pH 3 by the addition of a suitable buffer such as sodium acetate with a cool aqueous solution of benzene diazonium chloride. The resulting reaction mixture is stirred for several hours at a temperature of about 10 to −10° C. preferably for 2–3 hours at −9 to −5° C. It is necessary that this reaction mixture be kept cool to prevent hydrolysis of the diazonium salt until the desired coupling reaction has occurred. After this reaction period, the solution is warmed up to about 20–25° C. with stirring and more buffer is added to maintain the reaction mixture at approximately pH 3. The resulting mixture is then aged at room temperature for several hours during which time the product N-L-lyxityl-2-phenylazo-4,5-dimethyl aniline precipitates. This product is then conveniently recovered by filtration and after washing with water is dried under reduced pressure.

In the final step of my process, the 2-azo derivative of N-L-lyxityl-4,5-dimethyl aniline is condensed with a cyclic ureide, such as barbituric acid or alloxan, to obtain L-lyxoflavin. I have found that it is preferable to carry out this condensation in the presence of a suitable organic acid. The lower aliphatic carboxylic acids such as acetic acid are particularly useful as condensation mediums for carrying out this reaction. Alternatively, a mixture of an organic acid and a miscible organic solvent, preferably one having a boiling point in excess of about 70° C., may be employed for effecting the reaction. Thus, I have found that when the condensation is effected in a mixture of acetic acid and N-butanol, maximum yields of L-lyxoflavin can be obtained under optimum conditions.

In carrying out this process in accordance with a preferred embodiment of my invention, a solution of N-L-lyxityl-2-phenylazo-4,5-dimethyl aniline in n-butanol is added to a solution of barbituric acid in acetic acid and the resulting reaction mixture is heated under reflux for about five hours. When the heated reaction mixture is cooled L-lyxoflavin precipitates and may be recovered by filtration. The crude L-lyxoflavin obtained after washing and drying the precipitated product may be further purified by dissolving it in aqueous hydrochloric acid, extracting the aqueous solution with ether, treating the aqueous solution with a small amount of hydrogen peroxide, and cooling the aqueous solution to precipitate the L-lyxoflavin in crystalline form. The product may be further purified, if desired, by recrystallization from aqueous hydrochloric acid containing a small amount of hydrogen peroxide.

In accordance with a further embodiment of my invention, I have found that L-lyxoflavin serves as an excellent growth promoting agent for animals. More particularly, I have found that by incorporating L-lyxoflavin in the diets of animals such as rats, chickens and swine, a surprising and unexpected growth response is obtained. Thus, when L-lyxoflavin is incorporated in an otherwise nutritionally adequate diet, animals gain weight more rapidly. Further when L-lyxoflavin is added to diets supplemented with antibiotics such as aureomycin, an even greater increase in the growth rate of animals is obtained than on a diet containing no L-lyxoflavin.

Thus, in tests with rats, a new method has been devised for the assay of new unidentified vitamins in various source materials which clearly indicates the growth promoting effect of L-lyxoflavin.

The assay employs rats maintained on a diet in which the protein is supplied by soybean meal. The dietary components are given in Table I. In addition, the diet contained 0.5% of thyroid powder which enhances the development of a deficiency state by increasing metabolism. The animals were placed at weaning on the diet and were maintained for 28 days at which time they were segregated into groups of like average weights. A number of source materials were tested for activity by addition to the basal ration. The source materials replaced a corresponding amount of the carbohydrate component.

TABLE I

*Basal diet composition*

| Components: | G./100 g. |
|---|---|
| Soybean meal | 60 |
| Salt mixture #2 | 4 |
| Dextrose | 24 |
| Hydrogenated vegetable oil | 10 |
| Cod liver oil | 2 |

In addition, the following quantities of micronutrients in mg./100 g. of basal diet were added: thiamine, 1; riboflavin, 2; pyridoxine, 1; calcium pantothenate, 10; nicotinamide, 10; inositol, 5; choline, 100; paraaminobenzoic acid, 30; biotin, 0.05; folic acid, 0.2; alpha tocopherol, 14.2; menadione, 14.2. The 0.01 mg.%100 g. of vitamin $B_{12}$ was added to the diet following 28-days depletion.

It was found that some of these materials must contain new unidentified vitamins, because their presence stimulated growth. The evidence for the presence of these unidentified nutrients is summarized in Table II.

TABLE II

*Rat assay of new unidentified vitamins*

| Group of rats, 9-11 males each | Average weight gain, g. in 15 days |
|---|---|
| Basal (with 0.5% thyroid powder) | 64 |
| Defatted liver powder (10%) | 77 |
| Menhaden fish meal (10%) | 79 |
| Liver fraction L (10%) | 70 |
| Water insoluble liver solids (10%) | 83 |

Ershof (Proc. Soc. Exp. Biol. Med., 73, 459 (1950))

has reported that vitamin $B_{12}$ failed to counteract the growth-depressing effect of massive doses of thyroid when this material was administered in conjunction with a diet containing casein. Retardation of growth was prevented by the administration of a water-insoluble liver fraction.

Lyxoflavin was tested for vitamin activity in rats using a diet and test procedure described in the above section on a rat assay for unidentified vitamins. The results of Experiments 1 and 2 with lyxoflavin are summarized in Table III. It may be seen that the average weight gain elicited by the daily oral administration of lyxoflavin was similar to that elicited by the addition of liver powder, fish meal and other liver source materials to the diet.

TABLE III

*Testing of lyxoflavin for vitamin activity in rats*

| Expt. | Groups of rats, 9-11 males each | Average weight gain, g. in 15 days | |
|---|---|---|---|
| | | Basal diet | Plus 150 µg. lyxoflavin |
| 1 | (With 0.50% thyroid powder) | 64 | 78 |
| 2 | do | 64 | 88 |
| 3 | (With 0.60% thyroid powder) | 55 | 65 |
| 4 | (With 0.75% thyroid powder) | 58 | 67 |

This test of lyxoflavin in rats has additional significance in that the supplementation of the lyxoflavin resulted in a weight gain equivalent to that given by natural source materials rather than a part of the weight gain elicited by natural source materials.

The effect of increasing the amount of thyroid powder which is added to the basal diet was investigated. In Experiments 3 and 4 (Table III), the level of thyroid powder was increased to 0.60% and 0.75%, respectively. The administration of the same level (150 µg.) of lyxoflavin to the animals in these experiments resulted likewise in growth stimulation. It appeared that a level of 0.5–0.6% of thyroid powder is more satisfactory than a level of 0.75% since other groups of rats which received the high level showed excessive mortality.

The growth stimulating effect of L-lyxoflavin has also been shown by experiments with baby pigs whose diet was supplemented with L-lyxoflavin.

In these experiments, pigs were removed from their dams at 2 days of age and individually fed ad libitum a basal diet consisting of 68% sucrose, 25% casein, and 6% minerals made into a "milk" containing 19% solids to which was added 1% of cottonseed oil and all of the known vitamins at the time of feeding. In addition, 0.1% protamone was added in Experiment 1 and 0.01% in Experiments 2 and 3 to enhance the development of a deficiency state.

During the first three days of the experiments, lard was used to replace 30% of the sucrose in the diet. After the pigs learned to drink, the lard was gradually removed so that by the end of the first week the pigs were on the basal ration described above.

The pigs in each of the experiments were divided into two groups. Group I received the basal ration, and group II the basal ration plus 4 micrograms of synthetic L-lyxoflavin per gram of dry basal ration solids. Each experiment was continued for seven weeks.

The results of these experiments are as follows:

EXPERIMENT 1

| | Group I, Basal | Group II, Lyxoflavin |
|---|---|---|
| No. of pigs | 2 | 3 |
| Av. initial wt., kg | 2.76 | 2.91 |
| Av. total gain in 5 wks., kg | 10.03 | 12.14 |
| Av. total gain in 7 wks., kg | 16.27 | a 20.68 |
| Av. food consumed, kg./kg. gain | 2.32 | a 1.91 |
| Av. final wt., kg | 19.03 | 23.59 | a One pig only.

EXPERIMENT 2

| | 3 | 4 |
|---|---|---|
| No. of pigs | | |
| Av. initial wt., kg | 1.91 | 1.82 |
| Av. final wt., kg | 18.25 | 19.96 |
| Av. total gain, kg | 16.34 | b 18.14 |
| Av. food consumed, kg./kg. gain | 1.56 | c 1.43 | b Highly significant over Group I, $p<0.01$.
c Significant over Group I, $p<0.05$.

EXPERIMENT 3

| | 4 | 5 |
|---|---|---|
| No. of pigs | | |
| Av. initial wt., kg | 1.46 | 1.41 |
| Av. final wt., kg | 16.19 | d 17.81 |
| $\frac{\text{Av. final wt.}}{\text{Av. initial wt.}}$ | 11.08 | d 12.63 |
| Av. daily food consumed | 0.45 | 0.48 |
| Av. daily food consumed kg./kg. gain | 1.72 | 1.64 | d Statistically significant.

The results of tests conducted with chicks further indicated the growth promoting activity of L-lyxoflavin. Thus, in tests employing a chick assay method for unidentified factors described by Bruins et al., the growth promoting activity of L-lyxoflavin for chicks has been clearly established. The diet employed is an isolated soybean protein-sucrose diet, properly supplemented with salts, known vitamins, and aureomycin with the thiamin being supplied by injection.

A summary of the results of five experiments with chicks is given in Table IV. The results shown in the table demonstrate the growth response, alone and in combination with dried whey, wheat bran and liver residue elicited by the L-lyxoflavin.

TABLE IV

| Experiment Number [1] | Group No. | Addition to Basal Ration [2] | Two wk. wt.[3] grams |
|---|---|---|---|
| Experiment 1: 10 chicks/group. | 1 | None | 90 |
| | 2 | 3 mg./kg. L-lyxoflavin | 114 |
| | 3 | 5% wheat bran | 115 |
| | 4 | 5% wheat bran + 3 mg./kg. L-lyxoflavin. | 132 |
| | 5 | 10% dried whey + 10% liver residue. | 168 |
| Experiment 2: 14 chicks/group; L. S. D.[4]=13.7 gms. | 1 | None | 85 |
| | 2 | 3 mg./kg. L-lyxoflavin | 84 |
| | 3 | 15 mg./kg. L-lyxoflavin | 109 |
| | 4 | 5% wheat bran | 110 |
| | 5 | 5% wheat bran + 3 mg./kg. L-lyxoflavin. | 128 |
| | 6 | 5% wheat bran + 15 mg./kg. L-lyxoflavin. | 129 |
| Experiment 3: 13 chicks/group; L. S. D. = 9.8 gms. | 1 | None | 87 |
| | 2 | 5 mg./kg. L-lyxoflavin | 93 |
| | 3 | 10 mg./kg. L-lyxoflavin | 97 |
| | 4 | 15 mg./kg. L-lyxoflavin | 96 |
| | 5 | 30 mg./kg. L-lyxoflavin | 99 |
| | 6 | 4% dried whey + 4% liver residue. | 153 |
| Experiment 4: 13 chicks/group; L. S. D. = 14.8 gms. | 1 | None | 83 |
| | 2 | 2% liver residue | 99 |
| | 3 | 2% liver residue + 15 mg./kg. L-lyxoflavin. | 108 |
| | 4 | 2% liver residue + 4% dried whey. | 119 |
| | 5 | 4% liver residue + 4% dried whey. | 128 |
| Experiment 5: 12 chicks/group; L. S. D. = 14.8 gms. | 1 | None | 94 |
| | 2 | 15 mg./kg. L-lyxoflavin | 111 |
| | 3 | 4% liver residue | 132 |
| | 4 | 4% liver residue + 15 mg./kg. L-lyxoflavin. | 145 |
| | 5 | 4% dried whey | 115 |
| | 6 | 4% dried whey + 15 mg./kg. L-lyxoflavin. | 125 |
| | 7 | 4% dried whey + 4% liver residue. | 151 |
| | 8 | Less riboflavin | 51 |
| | 9 | Less riboflavin + 15 mg./kg. L-lyxoflavin. | 54 |

[1] Chicks weighed wing banded and randomized among groups and placed on experimental rations at day old.
[2] Supplements were made at the expense of sucrose.
[3] Mortality was negligible in all groups.
[4] Least significant difference.

The following examples are also presented to illustrate the process of obtaining L-lyxoflavin:

Example 1.—N-L-lyxityl-4,5-dimethyl aniline

A solution of 23.7 g. of crude, syrupy L-lyxose in 100 ml. of methanol was treated with a solution of 19 g. of 3,4-xylidine in 50 ml. of methanol, and hydrogenated at about 100 atmospheres and at 90–100° C. for about one hour in the presence of 6 g. of Raney nickel catalyst. The crystals present when the bomb was opened were dissolved by warming, and the catalyst was removed by filtration. The crystals of N-L-lyxityl-4,5-dimethyl aniline which separated on cooling were collected on a filter and dried; M. P. 147–148° C. When the reaction is carried out with pure lyxose, the yield is almost quantitative. The yield in this experiment represents the purity of the crude L-lyxose.

*Anal.*—Calc'd for $C_{13}H_{21}NO_4$: C, 61.15; H, 8.29; N, 5.49. Found: C, 61.43; H, 8.00; N, 5.43.

Example 2.—N-L-lyxityl-2-phenylazo-4,5-dimethyl aniline

A solution of 8 g. of aniline in a mixture of 23.5 ml. of 12 N hydrochloric acid and 55 ml. of water was cooled to 0° C. Solid sodium nitrite was added in small portions at such a rate that the temperature of the solution did not exceed 3° C., until 6 g. had been added. The solution was kept at 0° C. for one-half hour.

A suspension of 17.7 g. of N-L-lyxityl-4,5-dimethyl aniline in 140 ml. of water was treated with 23 ml. of 12 N hydrochloric acid and 22.8 g. of anhydrous sodium acetate, and the mixture was cooled to −5° C. The solution of diazotized aniline was added to this suspension. The resulting solution was stirred at −9 to −5° C. for one hour and at 0° C. for two hours. After warming to 20° C., the stirred solution was treated with a solution of 21.5 g. of anhydrous sodium acetate in 175 ml. of water at such a rate that the pH remained approximately 3, and the temperature 17–20° C. The resulting mixture was stirred at 22–25° C. for 17 hours. The precipitated crude N-L-lyxityl-2-phenylazo-4,5-dimethyl aniline was collected on a filter, washed with two 70 ml. portions of water, and dried to a constant weight in a vacuum oven at 50–60° C.

Example III.—L-lyxoflavin

A solution of the N-L-lyxityl-2-phenylazo-4,5-dimethyl aniline from the experiment described above in 150 ml. of n-butanol was added to 26.7 ml. of glacial acetic acid containing 13.8 g. of barbituric acid, and the mixture was stirred and refluxed for five hours. After cooling and stirring in an ice-bath for an hour, the mixture was filtered. The solid material was slurried in 160 ml. of water at 80° C. for one-half hour and, after cooling to 70° C., the solid was collected on a filter and washed with water and then methanol. The dark, crude material was dissolved in a mixture of 60 ml. of concentrated hydrochloric acid and 20 ml. of water. After two extractions with ether, the aqueous solution was freed from ether by a current of air and was then treated with 7 ml. of 30% hydrogen peroxide. After standing for about ten minutes, the solution was filtered through a layer of diatomaceous earth and poured into 700 ml. of boiling water. Cooling for several hours at 5° C. caused the precipitation of L-lyxoflavin. After two recrystallizations from concentrated hydrochloric acid, 30% hydrogen peroxide and water, as described above, the orange needles melted at 283–284° C. (dec.); $\alpha_D^{23}$ −49°±3° (c, 0.26 in 0.05 N sodium hydroxide). The analytical sample was dried over phosphorus pentoxide at 100° C.

*Anal.*—Calc'd for $C_{17}H_{20}N_4O_6$: C, 54.25; H, 5.36; N, 14.89. Found: C, 54.38; H, 5.39; N, 15.20.

Various changes and modifications may be made in carrying out the present invention without departing from the spirit and scope thereof. Insofar as these changes

I claim:

1. An improved animal feedstuff that comprises an animal feedstuff supplemented with L-lyxoflavin.

2. An improved poultry feedstuff that comprises a poultry feedstuff supplemented with L-lyxoflavin.

3. An improved swine feedstuff that comprises a swine feedstuff supplemented with L-lyxoflavin.

References Cited in the file of this patent

UNITED STATES PATENTS

| | | |
|---|---|---|
| 2,400,710 | Piersma | May 21, 1946 |
| 2,522,854 | Brink et al. | Sept. 19, 1950 |

OTHER REFERENCES

Karrer: Chem. Abst., v. 29, 237$^2$ (1935).
Pollares et al.: Archives of Biochemistry, vol. 22 (1949) pages 63–65.
Pollares et al.: Chem. Abst., page 5368 (1950), citing Arch. inst. cardiol. Med., vol. 19, pages 735–9 (1949).
Science News Letter, December 9, 1950, page 376.
Gardner et al.: Arch. Biochem., v. 34, 98–104 (November 1951), received April 10, 1951.